US012768010B2

(12) United States Patent
Wang et al.

(10) Patent No.: US 12,768,010 B2
(45) Date of Patent: Oct. 20, 2026

(54) PRODUCTION AND USE OF COMPOSITE GRAPHENE-COPPER POWDERS

(71) Applicant: GM Global Technology Operations LLC, Detroit, MI (US)

(72) Inventors: Qigui Wang, Rochester Hills, MI (US); Yi Liu, Troy, MI (US); Ronald C. Daul, Northville, MI (US); Ali Shabbir, Sterling Heights, MI (US); Kestutis A. Sonta, Troy, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 448 days.

(21) Appl. No.: 18/486,468

(22) Filed: Oct. 13, 2023

(65) Prior Publication Data

US 2025/0122595 A1 Apr. 17, 2025

(51) Int. Cl.

| | |
|---|---|
| ***C22C 1/10*** | (2023.01) |
| ***B33Y 80/00*** | (2015.01) |
| ***C01B 32/19*** | (2017.01) |
| ***C22C 9/00*** | (2006.01) |

(52) U.S. Cl.

CPC ............ *C22C 1/1042* (2013.01); *B33Y 80/00* (2014.12); *C01B 32/19* (2017.08); *C22C 9/00* (2013.01)

(58) Field of Classification Search

None

See application file for complete search history.

(56) References Cited

U.S. PATENT DOCUMENTS

2024/0339733 A1* 10/2024 Liu ..................... H01M 50/571

FOREIGN PATENT DOCUMENTS

| | | | | | |
|---|---|---|---|---|---|
| CN | 112877562 | A | * | 6/2021 | ............ B22F 1/0003 |
| CN | 116803571 | A | * | 9/2023 | ............. B22F 9/082 |
| KR | 101864513 | B1 | | 7/2018 | |
| WO | 2012173262 | A1 | | 12/2012 | |

OTHER PUBLICATIONS

Graphene Improves Properties of copper powder used in Additive manufacturing (Year: 2021).*

Hidalgo-Manrique, et al., "Copper/graphene composites: a review In Journal of materials science", Jun. 11, 2019, pp. 12236-12289, vol. 54, Manchester UK.

Sandeep, et al., "Additive manufacturing technologies: an overview of challenges and perspective of using electrospraying", 2018, pp. 190-214, vol. 4, No. 4, Singapore.

* cited by examiner

*Primary Examiner* — Jenny R Wu

(74) *Attorney, Agent, or Firm* — Vivacqua Crane, PLLC

(57) ABSTRACT

Systems, methods, and devices for forming and implementing a graphene-copper composite powder are disclosed. The graphene-copper composite powder may be formed by providing an inert environment, introducing a first mist to the inert environment, introducing a second mist to the inert environment, and mixing the first mist and the second mist within the inert environment to thereby produce a graphene-copper composite powder. The first mist being atomized copper with a negative charge, and the second mist including graphene flakes with a positive charge. The graphene-copper composite powder may be used to form components via additive manufacturing or traditional powder metallurgy processes.

8 Claims, 8 Drawing Sheets

PRODUCTION AND USE OF COMPOSITE GRAPHENE-COPPER POWDERS

INTRODUCTION

The disclosure relates to the field of composite powders and, more specifically, to systems and methods for producing and implementing composite graphene-copper powders for use in additive manufacturing or traditional powder metallurgy processes.

Graphene-copper composite materials may be used as conductors in various use cases, such as in battery-electric vehicles. Graphene-copper powders formed from mechanical mixing, such as ball milling, may introduce damage to graphene and oxidation of copper. This reduces desired properties of graphene and its coupling effect with copper. Therefore, there is a need in the art for mixing graphene-copper powders that avoids possible damage to the powder.

SUMMARY

It is desirable to mix copper particles and graphene flakes without irreversibly altering the graphene flakes. It is also desirable to inhibit oxidation of copper particles during formation of the composite powder and use of the composite powder to form a composite component. It is further desirable to optimize contact between the copper particles and planar faces of the graphene flakes.

Systems, methods, and devices in accordance with the present disclosure optimize formation of graphene-copper composite powders by mixing a first mist including copper particles and a second mist including pristine graphene flakes within an inert environment. The first mist and the second mist are provided with opposing charges such that, when mixed, copper particles in the first mist are attracted to planar surfaces on the graphene flakes in the second mist. Beneficially, this contact optimizes electrical properties of the graphene-copper composite powder. Moreover, because the imparted charges and process avoid irreversibly damaging the graphene flakes, material and electrical properties of the graphene-copper composite powder, as well as behaviors of the material, are more predictable with narrower tolerances and variation.

The graphene-copper composite powder may be sorted into a plurality of fractions having known particle size distributions with known area fractions or volume fractions of graphene flakes and copper particles. Each of the fractions may then be used in further processes, such as additive manufacturing processes. Beneficially, the optimized contact between the planar surfaces of the graphene flakes and the copper particles reduces interstitial voids formed by copper particles contacting only edges of graphene flakes, which optimizes material and electrical properties of resulting graphene-copper composite parts.

According to aspects of the present disclosure, a method includes providing an inert environment, introducing a first mist to the inert environment, introducing a second mist to the inert environment, and mixing the first mist and the second mist within the inert environment to thereby produce a graphene-copper composite powder. The first mist being atomized copper with a negative charge, and the second mist including graphene flakes with a positive charge.

According to further aspects of the present disclosure, the method further includes separating, using at least one mesh screen, the graphene-copper composite powder into a plurality of fractions within the inert environment.

According to further aspects of the present disclosure, the method further includes feeding a first fraction of the plurality of fractions into an additive manufacturing device connected to the inert environment.

According to further aspects of the present disclosure, the first mist is formed from copper melt fed into the inert environment through a high-pressure nozzle.

According to further aspects of the present disclosure, a process pressure of the inert environment includes a vacuum.

According to further aspects of the present disclosure, copper particles of the graphene-copper composite powder consist of copper nanoparticles.

According to further aspects of the present disclosure, the graphene flakes are formed via electrochemical exfoliation.

According to further aspects of the present disclosure, the method further includes forming, via additive manufacturing or traditional powder metallurgy process, a graphene-copper composite busbar from the composite powder.

According to further aspects of the present disclosure, the method further includes forming, via additive manufacturing or traditional powder metallurgy process, a graphene-copper composite heat sink from the composite powder.

According to aspects of the present disclosure, a system includes a chamber containing an inert environment therein, a first nozzle configured to introduce a first mist into a mixing portion of the inert environment, a second nozzle configured to introduce a second mist into the mixing portion of the inert environment, and an output configured to convey a graphene-copper composite powder from the inert environment. The graphene-copper composite powder is formed from mixing of the first mist of negatively charged atomized copper and the second mist of positively charged graphene flakes. The first mist being atomized copper with a negative charge, and the second mist including graphene flakes with a positive charge.

According to further aspects of the present disclosure, the system further includes at least one mesh screen configured to separate the graphene-copper composite powder into a plurality of fractions within the inert environment.

According to further aspects of the present disclosure, the first nozzle is a high-pressure nozzle.

According to further aspects of the present disclosure, copper particles of the graphene-copper composite powder consist of copper nanoparticles.

According to further aspects of the present disclosure, the system further includes a forming device configured to form, via additive manufacturing or traditional powder metallurgy process, a graphene-copper composite heat sink from the graphene-copper composite powder.

According to further aspects of the present disclosure, the system further includes a forming device configured to form, via additive manufacturing or traditional powder metallurgy process, a graphene-copper composite busbar from the graphene-copper composite powder.

According to aspects of the present disclosure, a graphene-copper composite powder is formed by providing an inert environment, introducing a first mist to the inert environment, introducing a second mist to the inert environment, and mixing the first mist and the second mist within the inert environment to thereby produce a graphene-copper composite powder. The first mist is atomized copper with a negative charge, and the second mist includes graphene flakes with a positive charge According to further aspects of the present disclosure, the graphene-copper composite powder is a fraction of a plurality of fractions separated, using at least one mesh screen, within the inert environment.

According to further aspects of the present disclosure, the first mist is formed from copper melt fed into the inert environment through a high-pressure nozzle.

According to further aspects of the present disclosure, copper particles of the graphene-copper composite powder consist of copper nanoparticles.

According to further aspects of the present disclosure, the graphene flakes are formed via electrochemical exfoliation.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
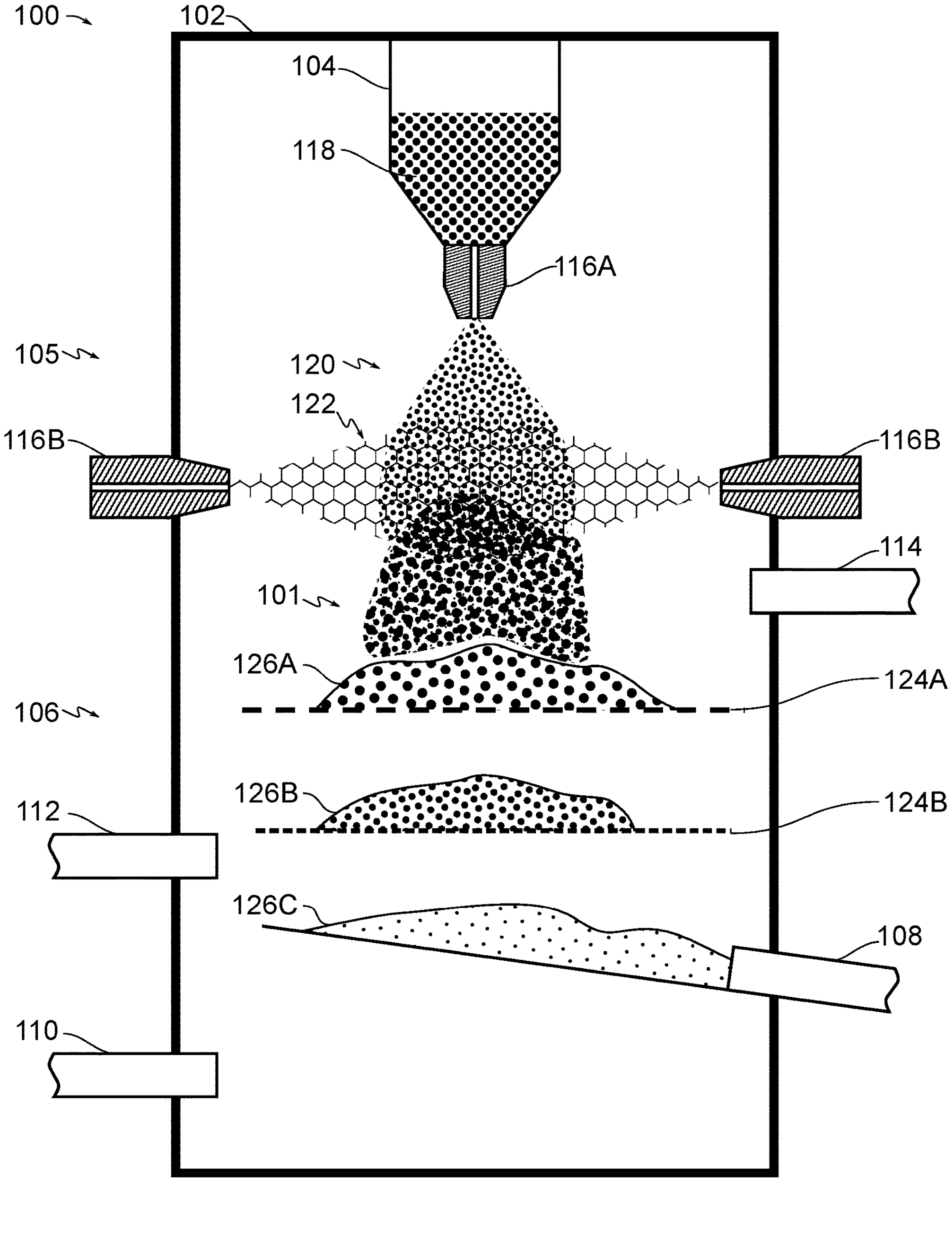
FIG. 1 illustrates an example system for producing a graphene-copper composite powder.

FIG. 1 illustrates an example system for producing a graphene-copper composite powder 101. The system includes a chamber 102, a copper feedstock 104, a graphene feedstock (not shown), a mixing portion 105, a separation portion 106, and a graphene-copper composite powder output 108. The chamber 102 includes an inert environment therein that may be conditioned using a vacuum source 110, an inert gas inlet 112 and inert gas outlet 114, as well as temperature regulation devices (not shown).

The vacuum source 110 is configured to evacuate air from the inert environment during startup. The vacuum source 110, or another vacuum source, may be further configured to maintain the inert environment at a desired process pressure either alone or in combination with other devices.

An inert gas flows through the system 100 to inhibit oxidation of the powder and particles thereof. The inert gas enters the chamber 102 via inert gas inlet 112 and exits the chamber 102 via inert gas outlet 114. The flow of the inert gas may be further configured to affect or to produce desired gas-flow patterns within the system. For example, the inert gas inlet 112 may be located below the separation portion 106 and the inert gas outlet 114 may be located above the separation portion 106 such that the flow of the inert gas promotes agitation of the graphene-copper composite powder 101 to aid in separation of the graphene-copper composite powder 101 by size (e.g., by promoting fluidization of the graphene-copper composite powder 101).

The temperature regulation devices are configured to heat and/or cool the inert environment to a desired temperature profile. The temperature profile may be a uniform temperature, a plurality of regions with different temperatures, a temperature gradient, combinations thereof, or the like. In some aspects, the temperature profile is produced by controlling temperatures of the feedstocks, spacing of components, and insulation or thermal conductivity of the system chamber 102.

Copper and graphene are fed into the mixing portion 105 of the system through respective spray nozzles 116. The copper and graphene are fed with opposing charges. Beneficially, while not being bound by theory, it is believed that providing the feeds as oppositely charged particles enhances both contact between the copper particles and graphene flakes and packing of the resultant graphene-copper composite powder 101. In some aspects, the nozzles 116 may include one or more high-pressure nozzles. Additionally, or alternatively, the nozzles 116 may include one or more electrospray nozzles.

Further, the amount of charge imparted on the particles is selected to reduce voids in the resultant powder and parts formed therefrom. For example, only a portion of the copper particles may be charged such that the charged particles are attracted to the graphene flakes while the uncharged particles reduce repulsive forces that may leave voids in a resultant powder or additive manufacturing process. Additionally, or alternatively, any residual charges may be removed by grounding after mixing (e.g., by grounding mesh screens 124).

A first nozzle 116A is coupled to the copper feedstock 104, such as a deoxidized copper melt 118. The first nozzle 116A is configured to produce a negatively charged, atomized copper mist 120 with a desired particle size distribution. For example, the copper particles within the atomized copper mist 120 may be nanoparticles. In some aspects, the diameter of the copper particles is approximately the lateral flake size of the graphene particles. While not being bound by theory, it is believed that this provides enhanced copper-copper interfaces. In alternative aspects, the diameter of the copper particles is an order of magnitude less than the lateral flake size of the graphene particles. While not being bound by theory, it is believed that this provides enhanced copper-copper and graphene-copper interfaces. In further aspects, the diameter of the copper particles is two orders of magnitude less than the lateral flake size of the graphene particles. While not being bound by theory, it is believed that this provides enhanced graphene-copper interfaces.

A second nozzle 116B is coupled to the graphene feed stock. The second nozzle 116B is configured to produce a positively charged graphene mist 122. The graphene feed stock includes pristine graphene flakes in a solvent. The graphene flakes are sized to provide desired mechanical, electrical conductivity, and/or thermal conductivity properties of resulting graphene-copper composite parts. The graphene flakes may single-layer graphene flakes and/or few-layer graphene flakes. In some aspects, the graphene flakes are formed via electrochemical exfoliation techniques. In some examples, the average lateral diameter of graphene flakes is between 10 nm and 10 μm.

The solvent is selected to avoid negative interactions with the copper mist 120. For example, the solvent is selected to avoid oxidizing the copper particles, flocking the copper particles, or producing an undesirable shape to the copper particles. The solvent is also selected not to be present in the resultant powder under process conditions. The solvent may be or include polar solvents like alcohols (e.g., methanol or ethanol) and/or nonpolar solvents like medium-to long-chain hydrocarbons (e.g., gasoline or kerosene).

The copper mist 120 and graphene mist 122 are combined in the mixing portion 105 of the inert environment. The mixing portion 105 is designed to produce a homogenous mixture of the two mists. For example, the nozzles 116 may be distributed about the mixing portion 105 such that turbulation from the sprayed mists provides for homogenous mixing of the copper particles and graphene flakes. Additionally, or alternatively, flow of the inert gas may be controlled to enhance mixing of the mists. For example, mixing may be enhanced by selecting positions of the inert gas inlet 112 and inert gas outlet 114, flowrate of the inert gas, positioning of flow-control features (e.g., baffles, shapers, and turbulators), combinations thereof, and the like.

After the two mists have homogenously mixed, the graphene-copper composite powder 101 settles to the separation portion 106 of the inert environment. The separation portion 106 may include, for example, a plurality of mesh screens 124. The mesh screens 124 are arranged such that the graphene-copper composite powder 101 is filtered by a first mesh screen 124A that has larger aperture sizes than a subsequent mesh screen 124B such that the graphene-copper composite powder 101 is separated into a plurality of fractions 126 having known and unique particle size distributions. Each of the plurality of fractions 126 may be selected for a respective use. For example, one of the fractions 126C may be selected for an additive manufacturing process, another of the fractions 126B may be further processed for another use, and another of the fractions 126A may be processed to remove contaminants and recycled into the copper melt 118.

In some examples, the graphene-copper composite powder 101 and/or a particular one or more of the fractions 126 are between 1 wt % and 40 wt % graphene. In further examples, the graphene-copper composite powder 101 and/or a particular one or more of the fractions 126 are between 5 wt % and 30 wt % graphene. In further examples, the graphene-copper composite powder 101 and/or a particular one or more of the fractions 126 are between 10 wt % and 20 wt % graphene. Beneficially, optimized tensile strength and electrical properties may be obtained with a composite graphene-copper composite powder having graphene flakes with an average lateral flake diameter of 2 μm and loading of 10 wt %, an average lateral flake diameter of 5 μm and loading of 15 wt %, or an average lateral flake diameter of 7 μm and loading of 20 wt %. Beneficially, reducing average lateral flake diameter generally reduces amount of graphene needed in the resulting powder.

In some aspects, the system is coupled to an additive manufacturing device, such as the device described with reference to FIG. 4 below. The graphene-copper composite powder output 108 may couple the devices such that they include a shared inert environment for one or more desired fractions 126 of the powder that are conveyed directly from the system to the additive manufacturing device. Additionally, or alternatively, the fractions 126 may be conveyed into a container within the inert environment, which may then be sealed, removed from the inert environment, moved to the additive manufacturing device, and opened/accessed for use within an inert environment of the additive manufacturing device.

Figure 2:
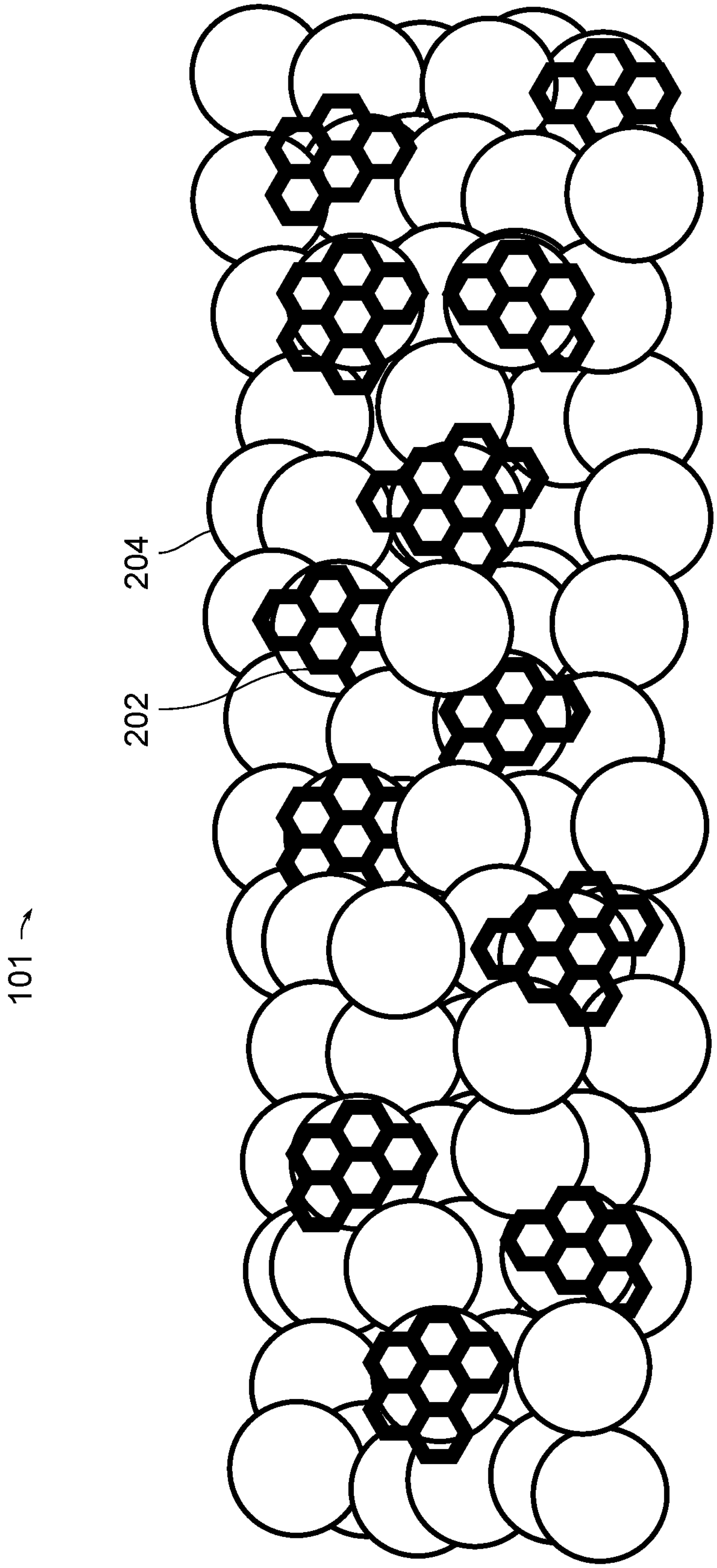
FIG. 2 illustrates an example graphene-copper composite powder.

FIG. 2 illustrates an example graphene-copper composite powder 101 produced by the system. As can be seen, the graphene flakes 202 are distributed throughout the copper particles 204. While not being bound by theory, it is believed that electrostatic or imparted charges enhance contact between the copper particles 204 and planar faces of the graphene flakes 202, which reduces or eliminates interstitial voids of the powder that would otherwise result from copper particles 204 contacting only edges of one or more graphene flakes 202.

The avoidance of interstitial voids and the optimized contact between the copper particles 204 and the graphene flakes 202 enhances electrical conductivity, thermal conductivity, and mechanical properties of parts made from the graphene-copper composite powder 101. Further, while not being bound by theory, it is believed that the charges may be selected to leverage the different electronic properties of the planar portions and the edge portions of the graphene flakes 202 and thereby further optimize packing and other physical properties of the powder, as well as the properties of parts formed from the powder. Beneficially, mixing of charged particles also increases graphene loading of the composite graphene-copper powder 101. For example, a composite graphene-copper powder formed from mixing charged particles may result in a graphene loading between 30 vol % and 40 vol %, which is above an expected loading between 20 vol % and 25 vol % for mixing the same particles without charges.

Figure 3:
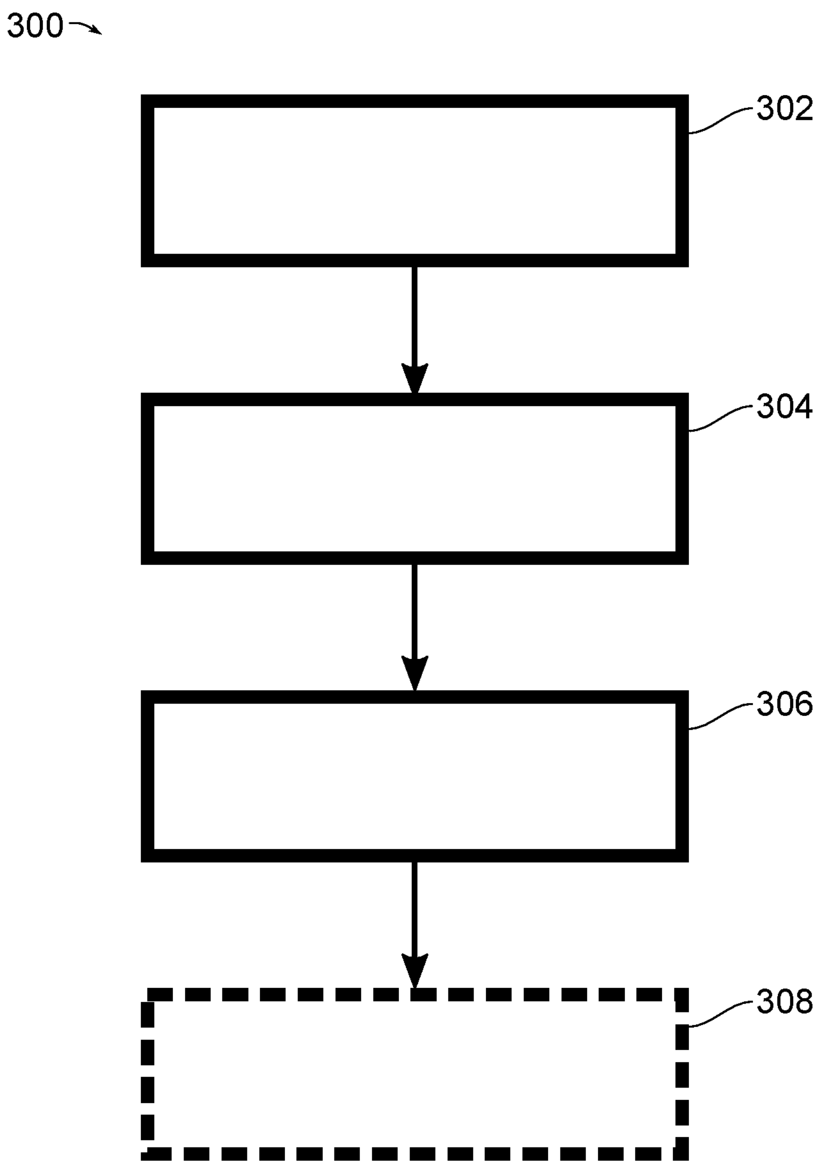
FIG. 3 illustrates a method of producing the graphene-copper composite powder.

FIG. 3 illustrates a method 300 of producing a graphene-copper composite powder 101. At step 302, the method includes providing an inert environment. A first mist, such as atomized copper particles 204, and a second mist, such as graphene flakes 202 in a solvent, are introduced to the environment in step 304. The first mist and the second mist are provided with opposing charges such that, when mixed, copper particles 204 in the first mist are attracted to planar surfaces on the graphene flakes 202 in the second mist. The method 300 further includes mixing the first mist and the second mist to produce the graphene-copper composite powder 101 at step 306. The method 300 may also include an optional step 308 of filtering the produced powder into a plurality of fractions 126 having known particle size distributions with known area fractions or volume fractions of graphene flakes 202 and copper particles 204. It is contemplated that the area fractions or volume fractions for each of the plurality of fractions may be different.

Figure 4:
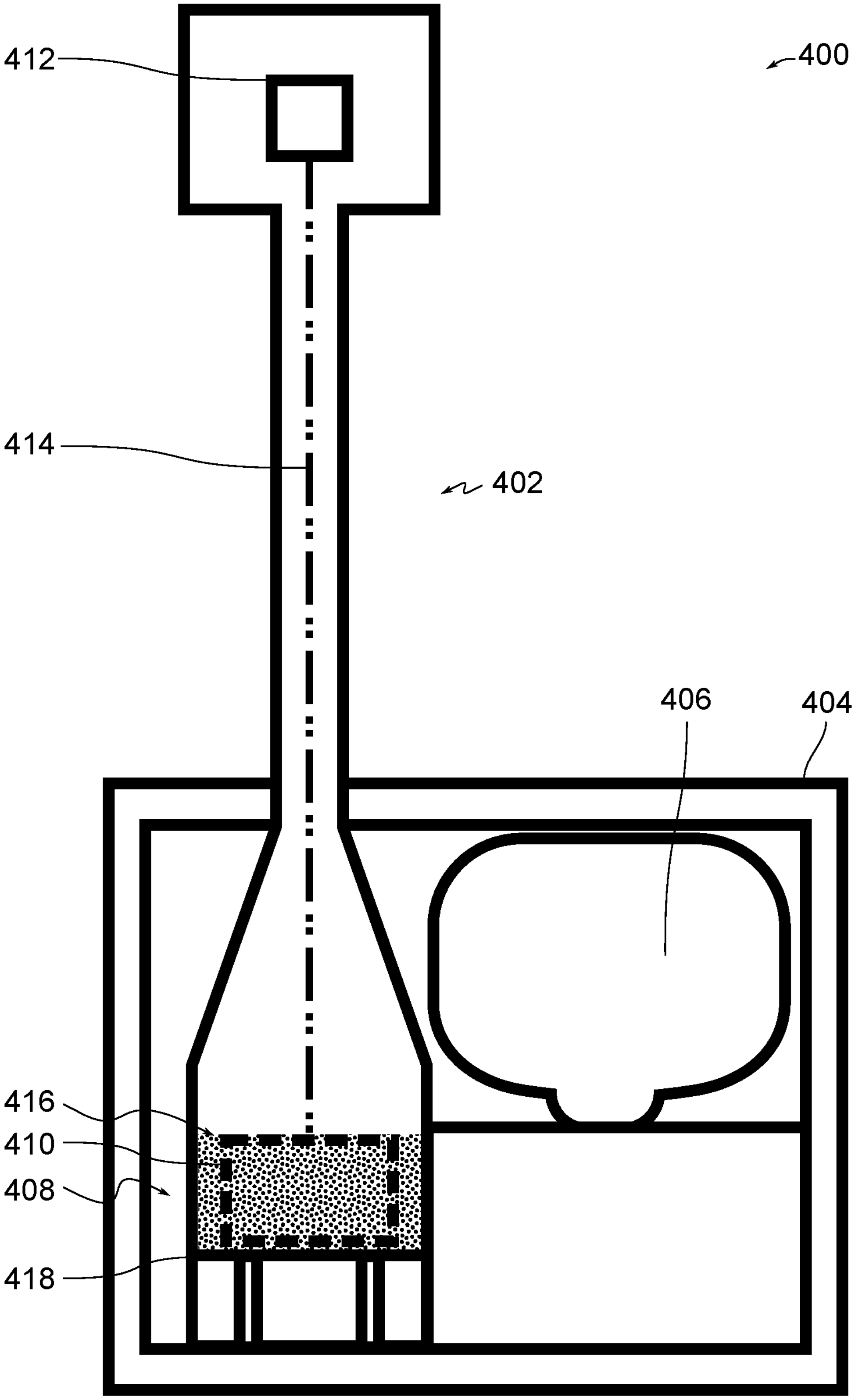
FIG. 4 illustrates an example additive manufacturing device.

FIG. 4 illustrates an example additive manufacturing device 400. The additive manufacturing device 400 is configured to form parts using the graphene-copper composite powder 101 via a layer-on-layer process. The additive manufacturing device 400 includes a sintering device 402, a chamber 404, a powder supply 406, and a powder bed 408. The chamber 404 includes an inert environment therein.

The sintering device 402 is configured to selectively form coherent portions within the graphene-copper composite powder 101 when the graphene-copper composite powder 101 is exposed to the sintering device 402. The selective formation of coherent portions produces a resulting graphene-copper composite part 410 such that the enhanced contact between the graphene flakes 202 and copper particles 204 of the graphene-copper composite powder 101 is maintained in the resulting graphene-copper composite part 410.

In the illustrated figure, the sintering device 402 is an electron gun 412 that emits a beam 414 of electrons. The electron beam 414 is shaped and targeted at a focal point corresponding to an upper surface 416 of the powder bed 408 such that the electron beam 414 fuses a volume of the graphene-copper composite powder 101 to produce a layer of the resulting graphene-copper composite part 410.

The inert environment may employ the same inert gas of the system or may employ a different inert gas. Additionally, or alternatively, the inert environment may be an ultra-low pressure environment. Further, the chamber 404 includes the powder supply 406 and the powder bed 408 within the inert environment.

The powder supply 406 is configured to maintain the graphene-copper composite powder 101 in an inert environment and feed it to the additive manufacturing device 400 for use in the powder bed 408. While the illustrated powder supply 406 is a container within the inert environment of the chamber 404, it is contemplated that the container or other conveyance mechanism may be connected to the outside of the chamber 404 without exposing the graphene-copper composite powder 101 to a non-inert environment.

The powder bed 408 includes a platform 418 that is movable relative to the sintering device 402. In the illustrated embodiment, the platform 418 is configured to move in three dimensions using a Cartesian coordinate system. It is contemplated that other systems may be used. The powder bed 408 is configured to contain an amount of the graphene-copper composite powder 101 that moves therewith.

Figure 5:
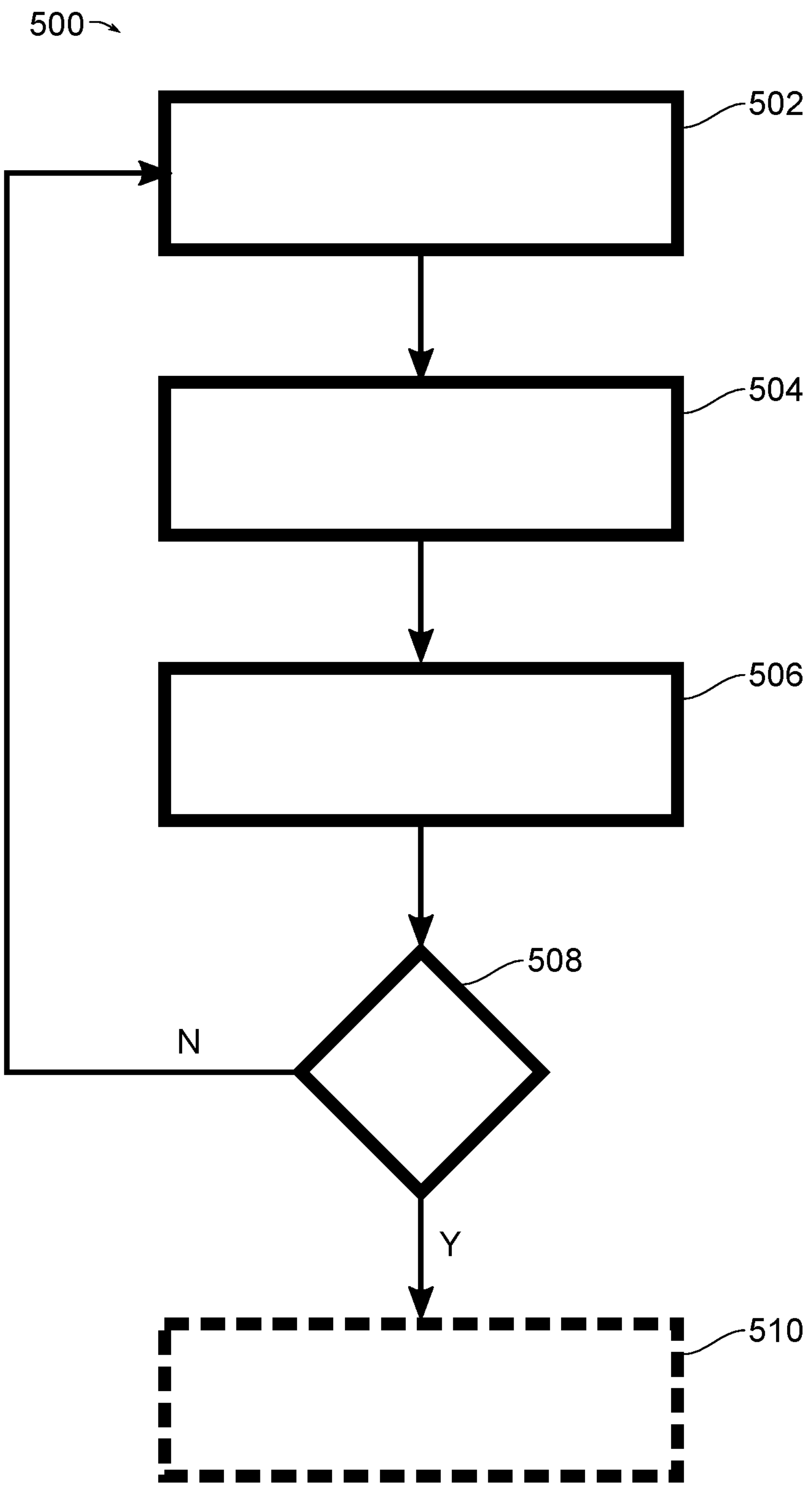
FIG. 5 illustrates a schematic process for producing a graphene-copper composite part from the graphene-copper composite powder.

FIG. 5 illustrates a schematic process 500 for producing a graphene-copper composite part 410 from the graphene-copper composite powder 101. The process 500 begins at step 502 by feeding an amount of the graphene-copper composite powder 101 onto a substrate. Next, at step 504, the amount of the graphene-copper composite powder 101 is prepared for sintering. The preparing may include, for example, drying the amount of the graphene-copper composite powder 101, bringing the amount of the graphene-copper composite powder 101 to a predetermined temperature or temperature profile, and/or treating a surface 416 of the graphene-copper composite powder 101 to enhance sintering or exposure to the sintering device 402. The surface treatment may include, for example, chemical or mechanical treatment.

Step 506 of the process 500 includes exposing the surface 416 of the powder bed 408 to the sintering device 402 while translating the powder bed 408. The powder bed 408 is translated in one or more dimensions and at one or more speeds such that the portions of the graphene-copper composite powder 101 that are exposed to the sintering device 402 form one or more features of a cross-sectional layer of the resultant part.

After the desired features of the layer are formed, step 508 of the process 500 includes determining whether the part is complete. If the part is not complete, the platform 418 is moved such that an additional layer of the resultant part may be formed and coupled to the prior layer. The process 500 then repeats steps 502, 504, and 506 by feeding another amount of the graphene-copper composite powder 101 onto the substrate atop the prior layer, preparing the graphene-copper composite powder 101 for sintering, and exposing the respective layer to the sintering device 402 while translating the powder bed 408 to form one or more features of that respective cross-sectional layer. This is repeated until all desired features of all desired layers of the part are formed.

Optionally, step 510 of the process 500 may include further processing or treating the formed part to produce a finished graphene-copper composite object having desired mechanical, thermal, and/or electronic properties. For example, hot pressing or annealing may be employed to optimize inter-layer adhesion and/or optimize grain boundaries and other material properties of the formed part. Additionally, or alternatively, the substrate may be a sacrificial substrate that is removed from the formed part through mechanical processes, chemical treatments, heat or light exposure, combinations thereof, and the like.

Figure 6A:
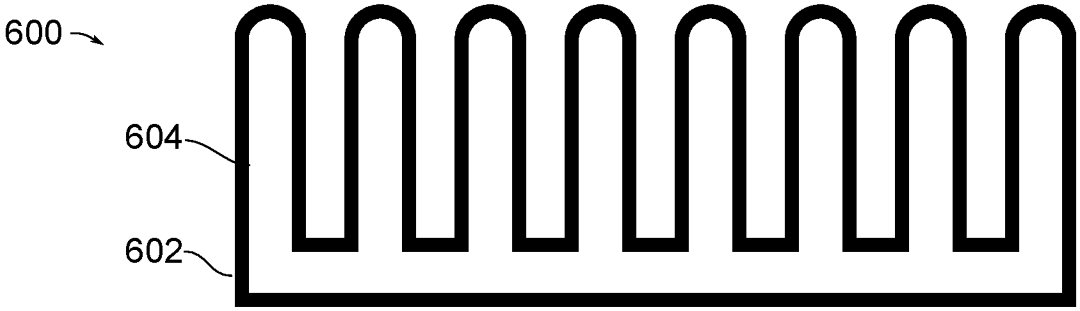
FIG. 6A illustrates a schematic first view of a graphene-copper composite heat sink.
Figure 6B:
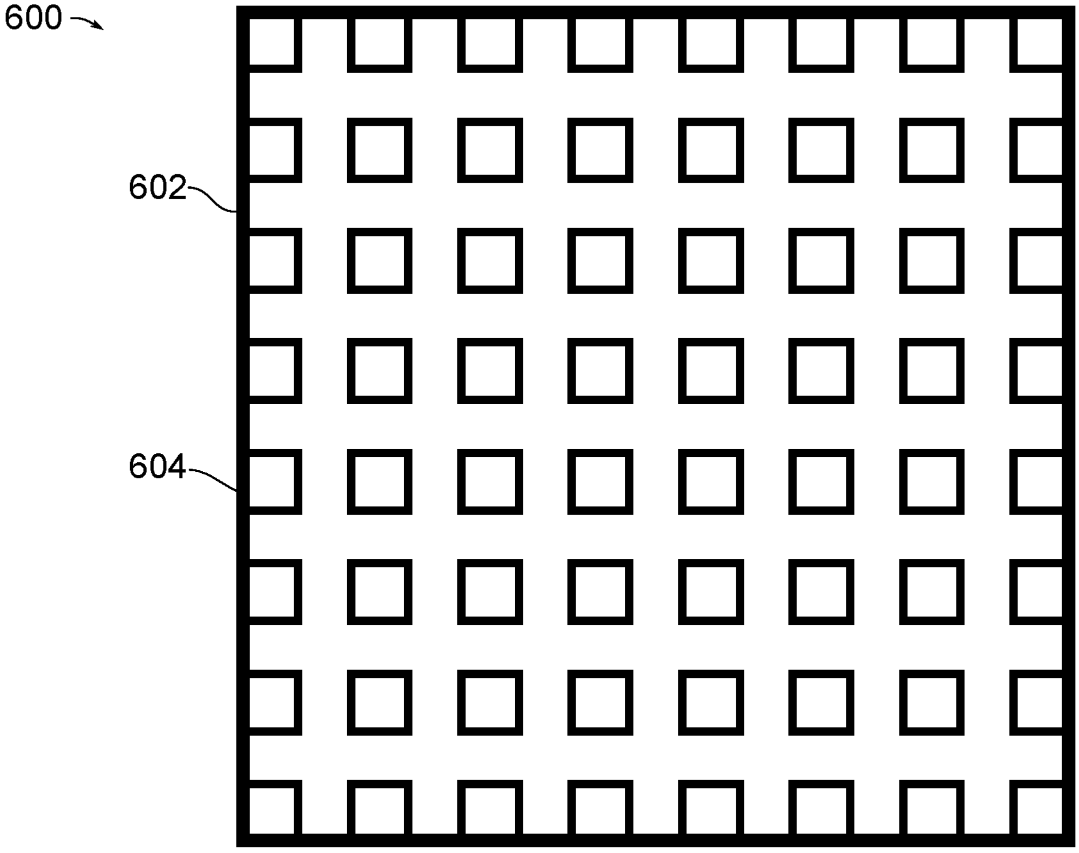
FIG. 6B illustrates a schematic second view of the composite heat sink of FIG. 6A.

FIGS. 6A and 6B illustrate a graphene-copper composite heat sink 600 produced using the process of FIG. 5. The graphene-copper composite heat sink 600 includes a base 602 and plurality of fins 604 configured to increase the heat flux from a heat-producing object. The base 602 is configured to contact the heat-producing object and conduct heat from the heat-producing object to the plurality of fins 604. The fins 604 are configured to increase surface area of the graphene-copper composite heat sink 600 exposed to the cooling fluid (such as air or liquids). The fins 604 may be formed during the additive manufacturing process or may be formed by subtractive processes (e.g., milling) a formed block of the graphene-copper composite material without negatively affecting the target properties of the graphene-copper composite heat sink 600 provided by the graphene-copper composite powder 101. Beneficially, the graphene-copper composite heat sink 600 optimizes cooling of the heat-producing part by optimizing grain properties (e.g., by inhibiting grain growth from high-temperature operation and/or electromagnetic field interactions) and thermal conductivity of the graphene-copper composite heat sink 600.

Figure 7:
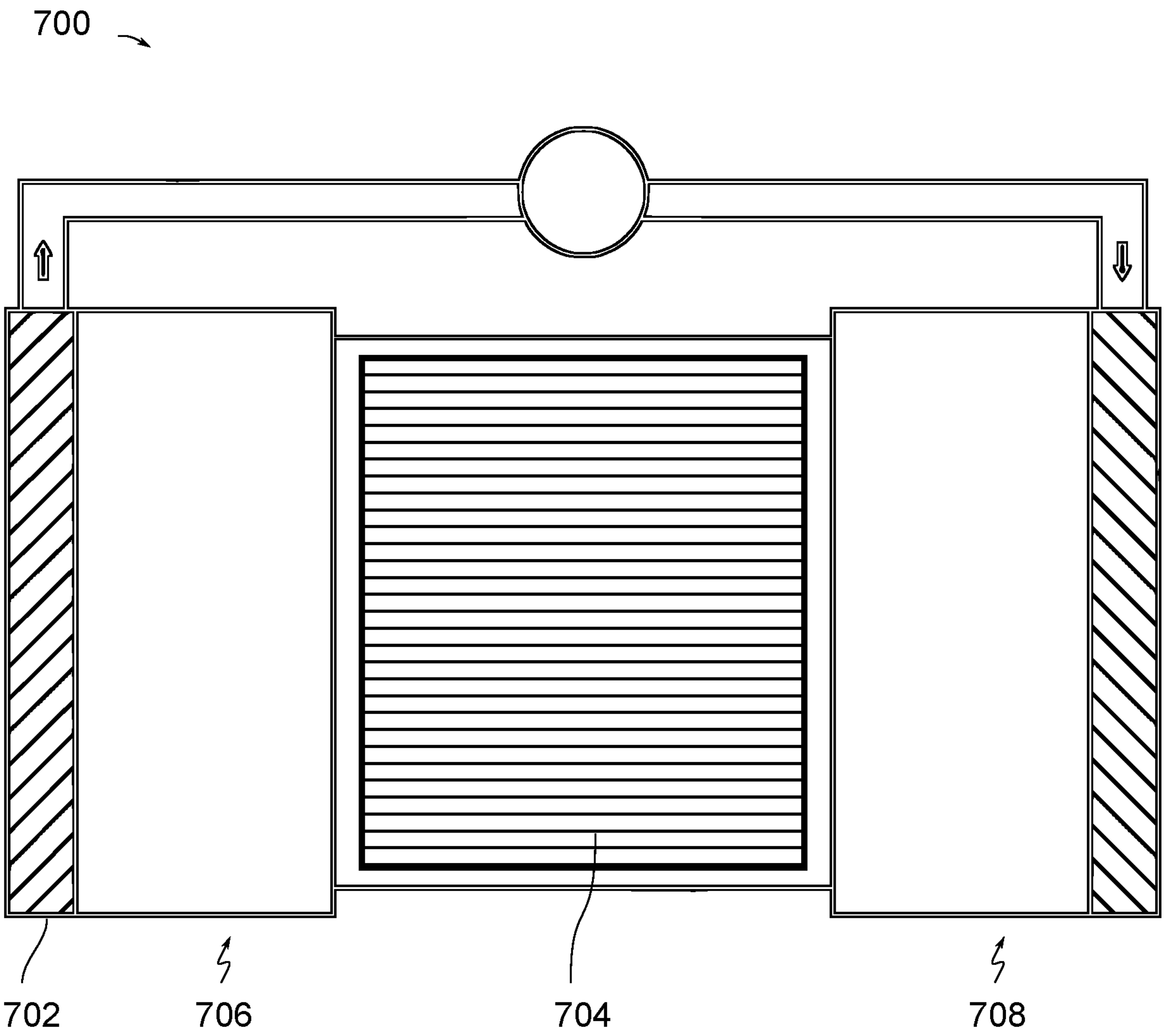
FIG. 7 illustrates a battery cell employing graphene-copper composite current collectors.

FIG. 7 illustrates a battery cell 700 employing graphene-copper composite current collectors 702. The battery cell 700 includes a separator 704 disposed between a first electrode 706 and a second electrode 708. The separator 704 allows ionic transfer and inhibits electronic transfer therethrough.

The first electrode 706 is configured to intercalate ions while the battery cell 700 is charging and de-intercalate ions while the battery cell 700 is discharging. The first electrode 706 is disposed on a first graphene-copper composite current collector 702. The first graphene-copper composite current collector 702 is configured to collect and move free electrons between the first electrode 706 and the second electrode 708 via an external circuit. The external circuit may include an external device which may be a load that consumes electric power from the battery cell 700 and/or a power source that provides electric power to the battery cell 700.

The second electrode 708 is configured to intercalate the ions received from the first electrode 706 when the battery cell 700 is discharging and de-intercalate the ions for transport to the first electrode 706 while the battery cell 700 is charging. The second electrode 708 includes a second electroactive material (not illustrated) and is disposed on a second graphene-copper composite current collector 702. The second electroactive material is formed from materials cooperative with the first electroactive material to facilitate ion flow and electron flow between the first electrode 706 and the second electrode 708.

The second graphene-copper composite current collector 702 is configured to collect and move free electrons between the first electrode 706 and the second electrode 708 via the external circuit. The second electrode 708 may also include a binder (not shown). In some aspects, the binder of the second electrode 708 is the binder.

Each of the first electrode 706, the second electrode 708, and the separator 704 may further include an electrolyte. The electrolyte is configured to promote movement of ions between the first electrode 706 and the second electrode 708 during charging and discharging of the lithium-ion cell. The electrolyte may be liquid, solid, or gel electrolyte.

Figure 8:
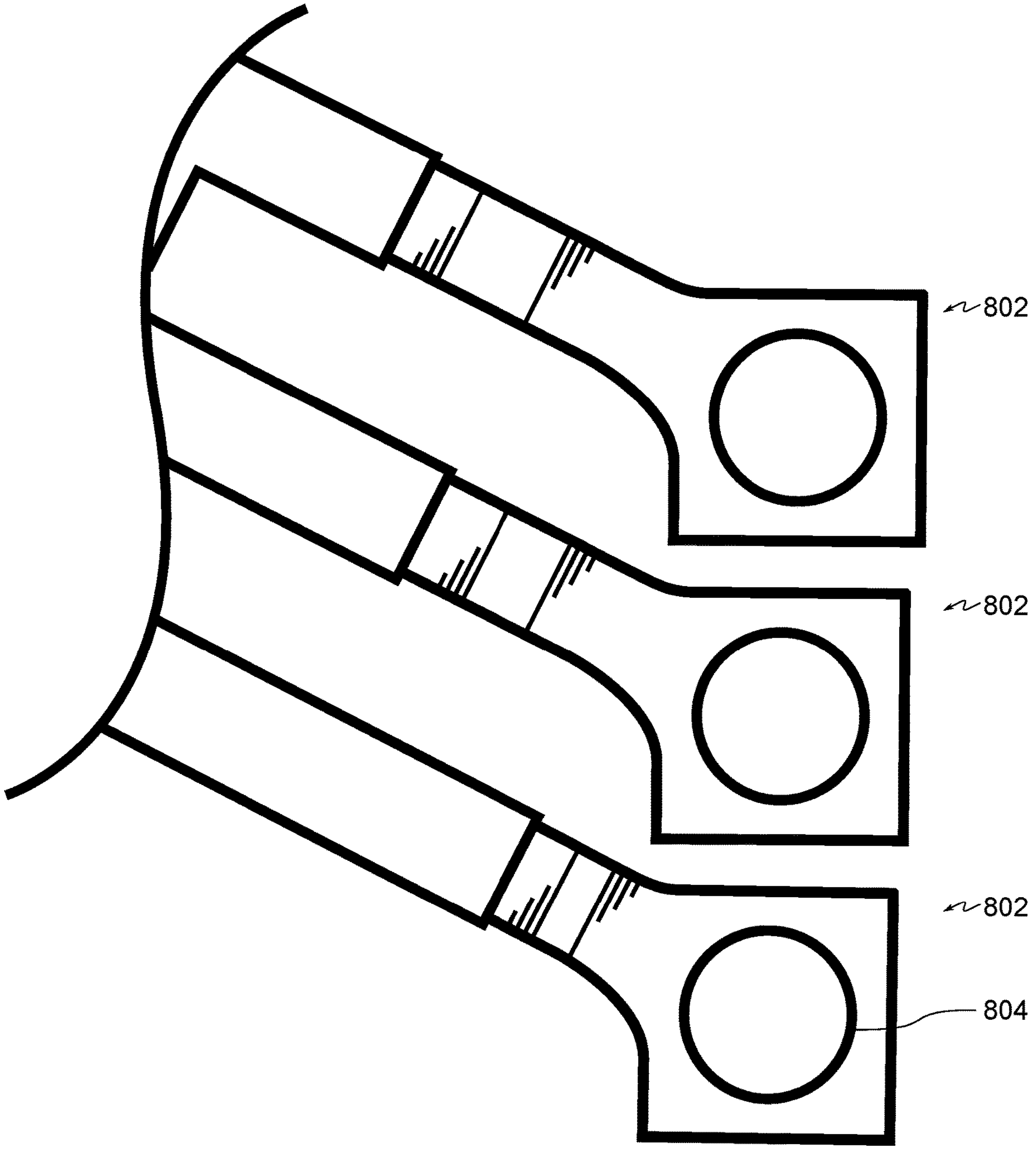
FIG. 8 illustrates graphene-copper composite busbars for use with an electric motor.

FIG. 8 illustrates graphene-copper composite busbars 802 for use with an electric motor. Each graphene-copper composite busbar 802 includes a coupler 804 configured to be electrically connected to a power source. The graphene-copper composite busbars 802 are attached to windings (not shown) of the electric motor such that current is carried between the power source (not shown) and the windings via the graphene-copper composite busbars 802. Beneficially, the enhanced mechanical properties of the graphene-copper composite busbars 802 optimize performance of the graphene-copper composite busbars 802 by avoiding effects on the material properties of plain copper busbars resulting from resistive heating generated during use. Beneficially, the enhanced thermal conduction of the graphene-copper composite busbars 802 also optimizes transfer of heat generated in the windings away from the motor, which increases operational efficiency, maintains desired material properties for the copper windings, and extends a lifetime of the electric motor. For example, the electric motor may produce an electro-magnetic field with a temperature ranging from 50° C. to 100° C. This may occur in short cycles, prolonged operation, and combinations thereof. The graphene-copper composite busbars 802 optimize microstructures of the material and inhibit grain growth and/or softening of the busbars that may occur with other materials. Beneficially, these optimized mechanical properties and enhanced durability also allow for heat transfer channels to be included with the graphene-copper composite busbars 802 to further enhance operation of the electric motor.

While the present disclosure discusses additive manufacturing using the graphene-copper composite powder 101, it is contemplated that other powder metallurgy forming devices and techniques may be used to produce graphene-copper composite parts using the graphene-copper composite powder 101.

The preceding detailed description is merely exemplary in nature and is not intended to limit the application and uses. Furthermore, there is no intention to be bound by expressed or implied theory presented in the preceding sections or the preceding detailed description.

As understood by one of skill in the art, the present disclosure is susceptible to various modifications and alternative forms, and some representative embodiments have been shown by way of example in the drawings and described in detail above. It should be understood, however, that the novel aspects of this disclosure are not limited to the particular forms illustrated in the appended drawings. Rather, the disclosure is to cover modifications, equivalents, combinations, sub-combinations, permutations, groupings, and alternatives falling within the scope and spirit of the disclosure and as defined by the appended claims.

As used herein, unless the context clearly dictates otherwise: the words "and" and "or" shall be both conjunctive and disjunctive, unless the context clearly dictates otherwise; the word "all" means "any and all" the word "any" means "any and all"; the word "including" means "including without limitation"; and the singular forms "a", "an", and "the" includes the plural referents and vice versa.

Numerical values of parameters (e.g., of quantities or conditions) in this specification, unless otherwise indicated expressly or clearly in view of the context, including the appended claims, are to be understood as being modified by the term "about" whether or not "about" actually appears before the numerical value. The numerical parameters set forth herein and in the attached claims are approximations that may vary depending upon the desired properties sought to be obtained by the present disclosure. At the very least, and not as an attempt to limit the application of the doctrine of equivalents to the scope of the claims, each numerical parameter should at least be construed in view of the number of reported significant digits and by applying ordinary rounding techniques.

Words of approximation, such as "approximately," "about," "substantially," and the like, may be used herein in the sense of "at, near, or nearly at," "within 0-10% of," or "within acceptable manufacturing tolerances," or a logical combination thereof, for example.

While the metes and bounds of the term "about" are readily understood by one of ordinary skill in the art, the term "about" indicates that the stated numerical value or property allows imprecision. If the imprecision provided by "about" is not otherwise understood in the art with this ordinary meaning, then "about" indicates at least variations that may arise from ordinary methods of measuring and using such parameters. For example, if not otherwise understood in the art, the term "about" means within 10% (e.g., ±10%) of the stated value.

While the metes and bounds of the term "substantially" are readily understood by one of ordinary skill in the art, the term "substantially" indicates that the stated numerical value or property allows some imprecision. If the imprecision provided by "substantially" is not otherwise understood in the art with this ordinary meaning, then "substantially" indicates at least variations that may arise from manufacturing processes and measurement of such parameters. For example, if not otherwise understood in the art, the term "substantially" means within 5% (e.g., ±5%) of the stated value.

While the metes and bounds of the term "essentially" are readily understood by one of ordinary skill in the art, the term "essentially" indicates that the stated numerical value or property allows some slight imprecision. If the imprecision provided by "essentially" is not otherwise understood in the art with this ordinary meaning, then "essentially" indicates at least negligible variations in desired parameters that may be impracticable to overcome. For example, if not otherwise understood in the art, the term "essentially" means within 1% (e.g., ±1%) of the stated value.

While the metes and bounds of the terms "pure" are readily understood by one of ordinary skill in the art, the term "pure" indicates that the compound may include very slight traces of other materials. If the imprecision provided by "pure" is not otherwise understood in the art with this ordinary meaning, then "pure" indicates at least variations that may arise from separation processes and measurement of such parameters. For example, if not otherwise understood in the art, the term "pure" means above 99.9% of the stated material.

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising: providing an inert environment; introducing a first mist to the inert environment, the first mist being atomized copper with a negative charge; introducing a second mist to the inert environment, the second mist including graphene flakes with a positive charge; and mixing the first mist and the second mist within the inert environment to thereby produce a graphene-copper composite powder including copper particles and graphene flakes, wherein the diameter of the copper particles is between one magnitude less to approximately the lateral flake size of the graphene flakes, and wherein the graphene flakes have an average lateral diameter between 10 nm and 10 μm.

2. The method of claim 1, further comprising separating, using at least one mesh screen, the graphene-copper composite powder into a plurality of fractions within the inert environment.

3. The method of claim 2, further comprising feeding a first fraction of the plurality of fractions into an additive manufacturing device connected to the inert environment.

4. The method of claim 1, wherein the first mist is formed from copper melt fed into the inert environment through a nozzle.

5. The method of claim 1, wherein the copper particles of the graphene-copper composite powder consist of copper nanoparticles.

6. The method of claim 1, wherein the graphene flakes are formed via electrochemical exfoliation.

7. The method of claim 1, further comprising forming, via additive manufacturing or traditional powder metallurgy process, a graphene-copper composite busbar from the composite powder.

8. The method of claim 1, further comprising forming, via additive manufacturing or traditional powder metallurgy process, a graphene-copper composite heat sink from the composite powder.

* * * * *